United States Patent [19]

Best

[11] Patent Number: 4,634,750

[45] Date of Patent: Jan. 6, 1987

[54] POLYMERIZATION CATALYST, PRODUCTION AND USE

[75] Inventor: Steven A. Best, Houston, Tex.

[73] Assignee: Exxon Research & Engineering Co., Florham Park, N.J.

[21] Appl. No.: 806,589

[22] Filed: Dec. 9, 1985

Related U.S. Application Data

[62] Division of Ser. No. 680,880, Dec. 12, 1984, Pat. No. 4,578,374.

[51] Int. Cl.$^4$ ................................................. C08F 4/68
[52] U.S. Cl. .................................... 526/129; 526/133; 526/142; 526/151; 526/348.6
[58] Field of Search ................ 526/129, 133, 142, 151

[56] References Cited

U.S. PATENT DOCUMENTS

| | | | |
|---|---|---|---|
| 4,173,547 | 11/1979 | Graff | 526/151 X |
| 4,385,161 | 5/1983 | Gaunt et al. | 526/129 X |
| 4,434,242 | 2/1984 | Roling et al. | 526/142 X |
| 4,508,842 | 4/1985 | Beran et al. | 526/142 X |

FOREIGN PATENT DOCUMENTS 0055589 7/1982 European Pat. Off. .
422192 8/1982 U.S.S.R. .

*Primary Examiner*—Patrick P. Garvin
*Attorney, Agent, or Firm*—Myron B. Kurtzman

[57] ABSTRACT

A vanadium-containing catalyst component useful for the polymerization of olefins to polyolefins having a high molecular weight and a broad molecular weight distribution comprising polymerizing the polyolefins in the presence of a catalyst comprising (A) a vanadium-containing catalyst component obtained by contacting an inert support material with a dihydrocarbyl magnesium compound, optionally an oxygen-containing compound, a vanadium compound, a Group III metal halide, and (B) an aluminum alkyl cocatalyst.

12 Claims, No Drawings

1

POLYMERIZATION CATALYST, PRODUCTION AND USE

This is a division of application Ser. No. 680,880 filed Dec. 12, 1984 and now U.S. Pat. No. 4,578,374.

BACKGROUND OF THE INVENTION

This invention relates to a novel solid catalyst component to be employed with a cocatalyst for use in the polymerization of olefins to polyolefins such as polyethylene, polypropylene and the like, or copolymers such as ethylene copolymers with other alpha-olefins and diolefins, which catalyst component shows unusually high activity, excellent hydrogen response for the control of polymer molecular weight and good comonomer response for the production of copolymers. The polymer product obtained has a good balance of polymer properties, for example, the catalyst system obtains a polymer with a broad molecular weight distribution and an improved balance in polymer product machine direction tear strength and transverse direction tear strength. As a result, the blown film produced from the polymer product manifests an overall higher strength. The invention also relates to polymerization catalyst systems comprising said component and polymerization processes employing such catalyst systems.

The catalyst component comprises a solid reaction product obtained by sequentially contacting a solid, particulate, porous support material such as, for example, silica, alumina, magnesia or mixtures thereof, for example, silica-alumina, with a dihydrocarbyl magnesium compound, optionally an oxygen containing organic compound, a vanadium compound and a Group IIIa metal halide or hydrocarbyl halide. The catalyst component, which when used with an aluminum alkyl cocatalyst, provides the catalyst system of this invention which can be usefully employed for the polymerization of olefins.

The catalyst system can be employed in slurry, single-phase melt, solution and gas-phase polymerization processes and is particularly effective for the production of linear polyethylenes such as high-density polyethylene and linear low density polyethylene (LLDPE).

It is known that catalysts of the type generally described as Ziegler-type catalysts are useful for the polymerization of olefins under moderate conditions of temperature and pressure. It is also well known that the properties of polymer product obtained by polymerizing olefins in the presence of Ziegler-type catalysts vary greatly as a function of the monomers of choice, catalyst components, catalyst modifiers and a variety of other conditions which affect the catalytic polymerization process.

For the production of high strength film, it is desirable that polymer product have a high molecular weight. However, high molecular weight resins such as polyethylene, which generally are of a narrow molecular weight distribution are difficultly processable.

It is therefore desirable to provide polyolefin resins having a high molecular weight so as to obtain high strength films therefrom coupled with a broad molecular weight distribution so as to provide an easily processable resin. It is furthermore highly desirable that the resin be produced by a commercially feasible and economical process which obtains polymer product having a good balance of properties.

U.S. Pat. No. 4,434,242 of Roling et al, issued Feb. 28, 1984, teaches a polymerization process for preparing injection molded resins by polymerizing ethylene in the presence of a vanadium based catalyst. However, as taught in the patent, the process provides resins having a narrow molecular weight distribution suitable for injection molded resins rather than blow molded resins.

In European Patent Application No. 55589, Asahi teaches treating an oxide support with an organomagnesium composition, a chlorosilane and then treating with a titanium or vanadium compound that has at least one halogenated atom. As demonstrated in Example 7, the resin obtains a relatively narrow molecular weight distribution which is statistically in the same range as the resins produced in the presence of titanium based catalysts.

Soviet No. 422,192 treats a silica support with an organoaluminum compound and a chlorinating agent and thereafter adds $TiCl_4$ to the material so as to obtain an active catalyst. The production of polyethylene having a high molecular weight and coupled with a broad molecular weight distribution is not disclosed.

U.S. Pat. No. 4,385,161 of Caunt et al describes a catalyst component obtained by contacting an inert particulate material with an organic compound, a halogen-containing compound, including boron trichloride and a transition metal compound such as $VOCl_3$. The active ingredients can be added to the inert particulate material all together in a single stage or preferably by adding the various components in sequence with the transition metal compound being added in the last stage.

The above patents do not suggest how its processes might be modified to result in the rapid production of polymers having a broad molecular weight distribution preferably coupled with a high molecular weight so as to provide resins suitable for the production of high-strength film polymers having a high MI together with a relatively high MIR.

Furthermore, the patents do not disclose catalyst systems which show excellent responsiveness to hydrogen during the polymerization reaction for the control of molecular weight, do not disclose or evidence the excellent comonomer response so as to produce ethylene copolymers and particularly LLDPE, and particularly do not disclose highly active catalyst systems which will obtain polymer at a very high rate of production.

In accordance with this invention catalyst combinations have been found which have extremely high catalytic activities, good comonomer incorporation, excellent hydrogen responsiveness for the control of molecular weight and obtain polymer product manifesting a broad molecular weight distribution with greatly improved film properties. The resins exhibit excellent melt strength with a surprising decrease in power consumption, hence an increase in extrusion rates, as well as excellent MD tear stength.

The new catalyst systems and catalyst component of this invention are obtained by contacting a dihydrocarbyl magnesium compound, a vanadium metal compound and a Group IIIa metal halide or hydrocarbyl halide in the presence of an inert particulate support. The catalyst system employing the vanadium based catalyst component is advantageously employed in a gas phase ethylene polymerization process since there is a significant decrease in reactor fouling as generally compared with prior art ethylene gas phase polymerization processes thereby resulting in less frequent reactor shut downs for cleaning.

SUMMARY OF THE INVENTION

In accordance with the objectives of this invention there is provided a vanadium based catalyst component useful for the polymerization of alpha-olefins comprising a solid reaction product obtained by sequentially treating an inert solid support material in an inert solvent with (A) a dihydrocarbyl magnesium compound or a complex or mixture of an organic dihydrocarbyl magnesium compound and an aluminum compound, (C) at least one vanadium compound, and (D) a Group IIIa metal halide or hydrocarbyl halide. In another aspect of the invention the dihydrocarbyl magnesium compound can be first reacted with an oxygen containing compound prior to its addition to the inert particulate support material, the oxygen containing compound can be added to the particulate support material followed by the addition of the dihydrocarbyl magnesium compound, the dihydrocarbyl magnesium compound can be added to the particulate support material immediately followed by the addition of the oxygen-containing compound, or the oxygen-containing compound and the dihydrocarbyl magnesium compound can be added simultaneously to the support material.

The solid vanadium based catalyst component when employed in combination with a cocatalyst such as an alkyl aluminum cocatalyst provides a catalyst system which demonstrates a number of unique properties that are of great importance in the olefin polymerization technology such as, for example, extremely high catalytic activity, the ability to obtain high molecular weight resins and the ability to control the resin molecular weight during the polymerization reaction as a result of the improved responsiveness to hydrogen so as to produce resins having a high melt index, increased polymer yield, and reduced reactor fouling. Preferably, the resins produced will manifest a broad molecular weight distribution coupled with a high molecular weight thereby facilitating the production of films having improved melt strength and tear strength.

In a preferred embodiment of the invention the (A) dihydrocarbyl magnesium compound is represented by the formula $R^1MgR^2$ wherein $R^1$ and $R^2$, which can be the same or different, are selected from alkyl groups, aryl groups, cycloalkyl groups and aralkyl groups having from 1 to 20 carbon atoms, the (B) vanadium compounds are hydrocarbon-soluble vanadium compounds in which the vanadium valence is 3 to 5 (mixtures of the vanadium compounds can be employed), and the (C) Group IIIa metal hydrocarbyl halide is a Group IIIa metal hydrocarbyl dihalide or boron trichloride. The catalyst system can further optionally comprise (A') an oxygen-containing compound wherein the oxygen-containing compound is selected from ketones, aldehydes, alcohols, siloxanes or mixtures thereof with the proviso that if the oxygen-containing alcohol, aldehyde, ketone or siloxane is employed, the inert solid support material can alternatively be treated with (i) the (A) dihydrocarbyl magnesium compound and the oxygen-containing compound simultaneously, (ii) the reaction product of the (A) dihydrocarbyl magnesium compound and the oxygen-containing compound, (iii) the oxygen-containing compound followed by treating with the (A) dihydrocarbyl magnesium compound, or (iv) the (A) dihydrocarbyl magnesium compound followed by treating with the oxygen-containing compound.

In accordance with this invention it is important that in the preparation of the catalyst component the Group IIIa metal halide treatment be performed in the last step.

In a second embodiment of this invention there is provided a catalyst system comprising the vanadium containing solid catalyst component and an organoaluminum cocatalyst for the polymerization of alpha-olefins using the catalyst of this invention under conditions characteristic of Ziegler polymerization.

In view of the high activity of the catalyst system prepared in accordance with this invention as compared with conventional vanadium based catalysts, it is generally not necessary to deash polymer product since polymer product will generally contain lower amounts of catalyst residues than polymer product produced in the presence of conventional catalyst.

The catalyst systems can be employed in a gas phase process, single phase melt process, solvent process or slurry process. The catalyst system is usefully employed in the polymerization of ethylene and other alpha-olefins, particularly alpha-olefins having from 3 to 8 carbon atoms and copolymerization of these with other 1-olefins or diolefins having from 2 to 20 carbon atoms, such as propylene, butene, pentene and hexene, butadiene, 1,4-pentadiene and the like so as to form copolymers of low and medium densities. The supported catalyst system is particularly useful for the polymerization of ethylene and copolymerization of ethylene with other alpha-olefins in gas phase processes to produce LLDPE or HDPE.

DESCRIPTION OF THE PREFERRED EMBODIMENTS

Briefly, the catalyst components of the present invention comprise the treated solid reaction product of (A) a dihydrocarbyl magnesium compound (B) optionally an oxygen-containing compound, (C) a vanadium compound, and (D) a Group IIIa metal halide in the presence of an inert support material. According to the polymerization process of this invention, ethylene, at least one alpha-olefin having 3 or more carbon atoms or ethylene and other olefins or diolefins having terminal unsaturation are contacted with the catalyst under polymerizing conditions to form a commercially useful polymeric product. Typically, the support can be any of the solid particulate porous supports such as talc, silica, zirconia, thoria, magnesia, and titania. Preferably the support material is a Group IIa, IIIa, IVa and IVb metal oxide in finely divided form.

Suitable inorganic oxide materials which are desirably employed in accordance with this invention include silica, alumina, and silica-alumina and mixtures thereof. Other inorganic oxides that may be employed either alone or in combination with the silica, alumina or silica-alumina are magnesia, titania, zirconia, and the like. Other suitable support materials, however, can be employed. For example, finely divided polyolefins such as finely divided polyethylene.

The metal oxides generally contain acidic surface hydroxyl groups which will react with the organometallic composition or transition metal compound first added to the reaction solvent. Prior to use, the inorganic oxide support is dehydrated, i.e., subject to a thermal treatment in order to remove water and reduce the concentration of the surface hydroxyl groups. The treatment is carried out in vacuum or while purging with a dry inert gas such as nitrogen at a temperature of about 100° to about 1000° C., and preferably from about 300° C. to about 800° C. Pressure considerations are not critical. The duration of the thermal treatment can be from about 1 to about 24 hours. However, shorter or longer times can be employed provided equilibrium is established with the surface hydroxyl groups.

Chemical dehydration as an alternative method of dehydration of the metal oxide support material can advantageously be employed. Chemical dehydration converts all water and hydroxyl groups on the oxide surface to inert species. Useful chemical agents are, for example, $SiCl_4$, chlorosilanes, silylamines and the like. The chemical dehydration is accomplished by slurrying the inorganic particulate material in an inert hydrocarbon solvent, such as, for example, heptane. During the dehydration reaction, the silica should be maintained in a moisture and oxygen-free atmosphere. To the silica slurry is then added a low boiling inert hydrocarbon solution of the chemical dehydrating agent, such as, for example, dichlorodimethylsilane. The solution is added slowly to the slurry. The temperature range during the chemical dehydration reaction can be from about 25° C. to about 120° C., however, higher and lower temperatures can be employed. Preferably the temperature will be from about 50° C. to about 70° C. The chemical dehydration procedure should be allowed to proceed until all the moisture is removed from the particulate support material, as indicated by cessation of gas evolution. Normally, the chemical dehydration reaction will be allowed to proceed from about 30 minutes to about 16 hours, preferably 1 to 5 hours. Upon completion of the chemical dehydration, the solid particulate material is filtered under a nitrogen atmosphere and washed one or more times with a dry, oxygen-free inert hydrocarbon solvent. The wash solvents, as well as the diluents employed to form the slurry and the solution of chemical dehydrating agent, can be any suitable inert hydrocarbon. Illustrative of such hydrocarbons are heptane, hexane, toluene, isopentane and the like.

The preferred (A) organometallic compounds employed in this invention are the hydrocarbon soluble organomagnesium compounds represented by the formula $R^1MgR^2$ wherein each of $R^1$ and $R^2$ which may be the same or different are alkyl groups, aryl groups, cycloalkyl groups, aralkyl groups, alkadienyl groups or alkenyl groups. The hydrocarbon groups $R^1$ and $R^2$ can contain between 1 and 20 carbon atoms and preferably from 1 to about 10 carbon atoms.

Illustrative but non-limiting examples of magnesium compounds which may be suitably employed in accordance with the invention are dialkylmagnesiums such as diethylmagnesium, dipropylmagnesium, di-isopropylmagnesium, di-n-butylmagnesium, di-isobutylmagnesium, diamylmagnesium, dioctylmagnesium, di-n-hexylmagnesium, didecylmagnesium, and didodecylmagnesium; dicycloalkylmagnesium, such as dicyclohexylmagnesium; diarylmagnesiums such as dibenzylmagnesium, ditolylmagnesium and dixylylmagnesium.

Preferably the organomagnesium compounds will have from 1 to 6 carbon atoms and most preferably $R^1$ and $R^2$ are different. Illustrative examples are ethylpropylmagnesium, ethyl-n-butylmagnesium, amylhexylmagnesium, n-butyl-s-butylmagnesium, and the like. Mixtures of hydrocarbyl magnesium compounds may be suitably employed such as for example dibutyl magnesium and ethyl-n-butyl magnesium.

The magnesium hydrocarbyl compounds are as generally obtained from commercial sources as mixtures of the magnesium hydrocarbon compounds with a minor amount of aluminum hydrocarbyl compound. The minor amount of aluminum hydrocarbyl is present in order to facilitate solubilization of the organomagnesium compound in hydrocarbon solvent. The hydrocarbon solvent usefully employed for the organomagnesium can be any of the well known hydrocarbon liquids, for example hexane, heptane, octane, decane, dodecane, or mixtures thereof, as well as aromatic hydrocarbons such as benzene, toluene, xylenes, etc.

The organomagnesium complex with a minor amount of aluminum alkyl can be represented by the formula $(R^1MgR^2)_p(R_3^6Al)_s$ wherein $R^1$ and $R^2$ are defined as above and $R^6$ has the same definition as $R^1$ and $R^2$ and p is greater than 0. The ratio of $s/s+p$ is from 0 to 1, preferably from 0 to about 0.7 and most desirably from about 0 to 0.1.

Illustrative examples of the magnesium aluminum complexes are $[(n-C_4H_9)(C_2H_5)Mg][(C_2H_5)_3Al]_{0.02}$, $[(nC_4H_9)_2Mg][(C_2H_5)_3Al]_{0.013}$, $[(nC_4H_9)_2Mg][(C_2H_5)_3Al]_{2.0}$ and $[(nC_6H_{13})_2Mg][(C_2H_5)_3Al]_{0.01}$. A suitable magnesium aluminum complex is Magala ® BEM manufactured by Texas Alkyls, Inc.

The hydrocarbon soluble organometallic compositions are known materials and can be prepared by conventional methods. One such method involves, for example, the addition of an appropriate aluminum alkyl to a solid dialkyl magnesium in the presence of an inert hydrocarbon solvent. The organomagnesium-organoaluminum complexes are, for example, described in U.S. Pat. No. 3,737,393 and U.S. Pat. No. 4,004,071 which are incorporated herein by reference. However, any other suitable method for preparation of organometallic compounds can be suitably employed.

The (D) optional oxygen containing compound which may be usefully employed in accordance with this invention are alcohols, aldehydes and ketones. Preferably the oxygen containing compounds are selected from alcohols and ketones represented by the formula $R^3OH$ and $R^4COR^5$ wherein $R^3$ and each of $R^4$ and $R^5$ which may be the same or different can be alkyl groups, aryl groups, cycloalkyl groups, aralkyl groups, alkadienyl groups, or alkenyl groups having from 2 to 20 carbon atoms. Preferably the R groups will have from 2 to 10 carbon atoms. Most preferably the R groups are alkyl groups and will have from 2 to 6 carbon atoms. Illustrative examples of alcohols which may be usefully employed in accordance with this invention are ethanol, isopropanol, 1-butanol, t-butanol, 2-methyl-1-pentanol, 1-pentanol, 1-dodecanol, cyclobutanol, benzyl alcohol, and the like; diols, such as 1,6-hexanediol, and the like with the proviso that the diol be contacted with the magnesium compound subsequent to the magnesium compound treatment of the support material. The most preferred alcohol is 1-butanol.

The ketones will preferably have from 3 to 11 carbon atoms. Illustrative ketones are methyl ketone, ethyl ketone, propyl ketone, n-butyl ketone and the like. Acetone is the ketone of choice.

Illustrative of the aldehydes which may be usefully employed in the preparation of the organomagnesium compound include formaldehyde, acetaldehyde, propionaldehyde, butanal, pentanal, hexanal, heptanal, octanal, 2-methylpropanal, 3-methylbutanal, acrolein, crotonaldehyde, benzaldehyde, phenylacetaldehyde, o-tolualdehyde, m-tolualdehyde, and p-tolualdehyde.

Illustrative of the siloxanes which may be usefully employed in the preparation of the organomagnesium compound include hexamethyldisiloxane, octamethyltrisiloxane, octamethylcyclotetrasiloxane, decamethylcyclopentasiloxane, sym-dihydrotetramethyldisiloxane, pentamethyltrihydrotrisiloxane, methylhydrocyclotetrasiloxane, both linear and branched polydimethylsiloxanes, polymethylhydrosiloxanes, polyethylhydrosilixanes, polymethylethylsiloxanes, polymethyloctylsiloxanes, and polyphenylhydrosiloxanes.

The magnesium compound in whatever form can be conveniently added to the agitated slurry containing the inert particulate support such as silica in solution form, e.g., in hexane, benzene, toluene, etc. Alternatively, the magnesium compound can be added to the slurry in non-solution form.

The optional oxygen-containing compound can be added to the silica prior to the addition of the magnesium compound immediately after the addition of the magnesium compound to the silica simultaneously with the magnesium compound or as the reaction product with the magnesium alkyl. The oxygen-containing compound, when added independently of the magnesium compound, can be conveniently added to the agitated slurry containing the inert particulate support in solution form, for example, in hexane, benzene, toluene, etc.

In accordance with this invention, the Group IIIa metal halides are employed to obtain increased catalytic activity over similar catalyst systems absent the said halides. It has been discovered that the use of the metal halides obtain the desirable increase in activity without detrimentally affecting the broad molecular weight distribution obtained in accordance with this invention.

(C) vanadium compound which can be usefully employed in the preparation of the vanadium containing catalyst component of this invention are well known in the art and can be represented by the formulas $$VCl_x(OR)_{3-x}, \tag{1}$$

where x=0–3 and R=a hydrocarbon radical;

$$VCl_y(OR)_{4-y}, \tag{2}$$

where y=3—4 and R=a hydrocarbon radical;

$$V(AcAc)_z\overset{(O)_{3-z}}{}, \tag{3}$$

where z=2-3 and (AcAc)=acetyl acetonate group;

$$VCl_2(AcAc) \text{ or } VCl(AcAc)_2, \tag{4}$$

where (AcAc)=acetyl acetonate group; and $$VCl_3 \cdot nL, \tag{5}$$

where n=2—3 and L=Lewis base, such as tetrahydrofuran,
which can form hydrocarbon-soluble complexes with VCl$_3$.

In formulas 1 and 2 above, R preferably represents a C$_1$ to C$_8$ aliphatic radical free of aliphatic unsaturation or aromatic hydrocarbon radical such as straight- or branded-chemical alkyl, aryl, cycloalkyl, alkanyl, aralkyl group such as methyl, ethyl, propyl, isopropyl, butyl, n-butyl, i-butyl, t-butyl, pentyl, hexyl, cyclohexyl, octyl, benzyl, dimethyl phenyl, naphthyl, etc.

Illustrative, but non-limiting examples of the vanadium compounds are vanadyl trichloride, vanadium tetrachloride, vanadium tetrabutoxy, vanadium trichloride, vanadyl acetylacetonate, vanadium acetylacetonate, vanadyl dichloroacetylacetonate, vanadium trichloride complexed with tetrahydrofuran, vanadyl chlorodiacetylacetonate, vanadyl tribromide, vanadium tetrabromide, and the like.

The vanadium compound is preferably added to the reaction mixture in the form of a solution. The solvent can be any of the well-known inert hydrocarbon solvents such as hexane, heptane, benzene, toluene, and the like.

The (D) Group IIIa metal halides are preferably selected from boron trihalide and boron and aluminum dialkyl halides. The alkyl group can have from 1 to 12 carbon atoms. Illustrative, but non-limiting examples of the Group III metal alkyl halides are methyl aluminum dichloride, ethyl aluminum dichloride, propyl aluminum dichloride, butyl aluminum dichloride, isobutyl aluminum dichoride, pentyl aluminum dichloride, neopentyl aluminum dichloride, hexyl aluminum dichloride, octyl aluminum dichloride, decyl aluminum dichloride, dodecyl aluminum dichloride, methyl boron dichloride, ethyl boron dichloride, propyl boron dichloride, butyl boron dichloride, isobutyl boron dichloride, pentyl boron dichloride, neopentyl boron dichloride, hexyl boron dichloride, octyl boron dichloride, decyl boron dichloride and the like. The preferred Group III metal halides are boron trichloride, ethyl aluminum dichloride and ethyl boron dichloride.

Preferably, the Group III halide treatment step will be from about 4 hours to 6 hours, however, greater or lesser time can be used for the treatment.

The Group IIIa metal halide is conveniently added to the reaction slurry which comprises the solid particulate material, or the solid reaction product from the treatment of the solid particulate material and the aluminum alkyl. The addition of the halogen containing compound can be effected by using a solution of the halogen-containing compound in an inert solvent such as, for example, a aliphatic hydrocarbon solvent or a aromatic hydrocarbon solvent. The halogen-containing compound can also be added as a gas. The halogen-containing compound can also be added at two separate steps during the catalyst component preparation, for example, after the aluminum alkyl treatment and thereafter after the vanadium compound treatment.

The treatment of the support material as mentioned above is conducted in an inert solvent. The inert solvent can be the same as that employed to dissolve the individual ingredients prior to the treatment step. Preferred solvents include mineral oils and the various hydrocarbons which are liquid at reaction temperatures and in which the individual ingredients are soluble. Illustrative examples of useful solvents in addition to those mentioned above include the alkanes such as pentane, isopentane, hexane, heptane, oxtane and nonane; cycloalkanes such as cyclopentane, cyclohexane; and aromatics such as benzene, toluene, ethylbenzene and diethylbenzene. The amount of solvent employed is not critical. Nevertheless, the amount employed should be sufficient so as to provide adequate heat transfer away from the catalyst components during reaction and to permit good mixing.

The amounts of catalytic ingredients employed in the preparation of the solid catalyst component can vary over a wide range. The concentration of magnesium compound deposited on the essentially dry, inert support can be in the range from about 0.1 to about 100 millimoles/g of support, however, greater or lesser amounts can be usefully employed. Preferably, the magnesium compound concentration is in the range of 0.1 to 10 millimoles/g of support and more preferably in the range of 0.5 to 1.1 millimoles/g of support. The amount of Group IIIa metal halide employed should be such as to provide a halogen to magnesium mole ratio of about 1 to about 10 and preferably 1.5 to 3.0.

The magnesium to optional oxygen-containing compound mole ratio can be in the range of from about 0.05 to about 20. Preferably, the ratio is in the range of 0.5 to about 2 and more preferably 0.5 to about 1.5. The hydrocarbyl groups on the oxygen-containing compounds should be sufficiently large so as to insure solubility of the reaction product.

The vanadium compound is added to the inert support reaction slurry at a concentration of about 0.1 to about 10 millimoles V/g of dried support, preferably in the range of about 0.1 to about 1 millimoles V/g of dried support and especially in the range of about 0.1 to 0.5 millimoles V/g of dried support.

Generally, the individual reaction steps can be conducted at temperatures in the range of about $-50°$ C. to about 150° C. Preferred temperature ranges are from about $-30°$ C. to about 60° C. with $-10°$ C. to about 50° C. being most preferred. The reaction time for the individual treatment steps can range from about 5 minutes to about 24 hours. Preferably the reaction time will be from about 1/8 hour to about 8 hours. During the reaction constant agitation is desirable.

In the preparation of the vanadium metal-containing solid catalyst component, washing after the completion of any step may be effected.

The catalyst components prepared in accordance with this invention are usefully employed with cocatalysts well known in the art of the Ziegler catalysis for polymerization of olefins. Typically, the cocatalysts which are used together with the transition metal containing catalyst component are organometallic compounds of Group Ia, IIa and IIIa metals such as aluminum alkyls, aluminum alkyl hydrides, lithium aluminum alkyls, zinc alkyls, magnesium alkyls and the like. The cocatalysts preferably used are the organoaluminum compounds. The preferred alkylaluminum compounds are represented by the formula $AlR'_nX'_{3-n}$ wherein R' is hydrogen, hydrocarbyl or subtituted hydrocarbyl group and n is as defined herein above. Preferably R' is an alkyl group having from 2 to 10 carbon atoms. Illustrative examples of the cocatalyst material are ethyl aluminum dichloride, ethyl aluminum sesquichloride, diethyl aluminum chloride, aluminum triethyl, aluminum tributyl, diisobutyl aluminum hydride, diethyl aluminum ethoxide and the like. Aluminum trialkyl compounds are most preferred with triisobutylaluminum and aluminum triethyl being highly desirable. X' is halogen and preferably chlorine.

The catalyst system comprising the aluminum alkyl cocatalyst and the vanadium metal containing solid catalyst component is usefully employed for the polymerization of ethylene, other alpha-olefins having from 3 to 20 carbon atoms, such as for example, propylene, butene-1, pentene-1, hexene-1, 4-methylpentene-1, and the like and ethylene copolymers with other alpha-olefins or diolefins such as 1,4-pentadiene, 1,5-hexadiene, butadiene, 2-methyl-1,3-butadiene and the like. The polymerizable monomer or preference is ethylene. The catalyst system may be usefully employed to produce polyethylene or copolymers of ethylene by copolymerizing with other alpha-olefins or diolefins, particularly propylene, butene-1, pentene-1, hexene-1, and octene-1. The catalyst is especially useful for the preparation of high molecular weight LLDPE and HDPE and have broad molecular weight distribution. Typically the polymers will have a melt index of 0.1–100 and melt index ratio from about 30 to about 80. The olefins can be polymerized in the presence of the catalysts of this invention by any suitable known process such as, for example, suspension, solution and gas-phase processes.

The polymerization reaction employing catalytic amounts of the above-described solid catalyst can be carried out under conditions well known in the art of Ziegler polymerization, for example, in an inert diluent at a temperature in the range of 50° C. to 120° C. and a pressure of 1 and 40 atmospheres in the gas phase at a temperature range of 70° C. to 100° C. at about 1 atmosphere to 50 atmospheres and upward. Illustrative of the gas-phase processes are those disclosed in U.S. Pat. No. 4,302,565 and U.S. Pat. No. 4,302,566, which references are hereby incorporated in their entirety by reference. As indicated above, one advantageous property of the catalyst system of this invention is the reduced amount of gas phase reactor fouling. The catalyst system can also be used to polymerize olefins at single phase conditions, i.e., 150° C. to 320° C. and 1,000–3,000 atmospheres. At these conditions the catalyst lifetime is short but the activity sufficiently high that removal of catalyst residues from the polymer is unnecessary. However, it is preferred that the polymerization be done at pressures ranging from 1 to 50 atmospheres, preferably 5 to 25 atmospheres.

Improved yields can be further obtained by employing polymerization promoters (activators) in combination with the catalyst system of this invention. The polymerization activators, in accordance with this invention, are preferably chlorocarbon activators. The activators are generally added to the polymerization reactor as a separate component. However, in the alternative, the activator can be adsorbed onto the surface of the catalyst component of this invention. The activator serves to significantly increase the productivity of the catalyst. Illustrative but non-limiting examples of the chlorocarbons are $CHCl_3$, $CFCl_3$, $CH_2Cl_2$, rethyltrichloroacetate, methyltrichloroacetate, hexachloropropylene, butylperchlorocrotonate, 1,3-dichloropropane, 1,2,3-trichloropropane, and 1,1,2-trichlorotrifluoroethane, etc. The activators may be gases or liquids at the conditions of polymerization.

In the processes according to this invention it has been discovered that the catalyst system is highly responsive to hydrogen for the control of molecular weight. Other well known molecular weight controlling agents and modifying agents, however, may be usefully employed.

The polyolefins prepared in accordance with this invention can be extruded, mechanically melted, cast or molded as desired. They can be used for plates, sheets, films and a variety of other objects.

While the invention is described in connection with the specific examples below, it is understood that these are only for illustrative purposes. Many alternatives, modifications and variations will be apparent to those skilled in the art in light of the below Examples and such alternatives, modifications and variations fall within the general scope of the claims.

In the examples following the silica support was prepared by placing Davison Chemical Company G-952 silica gel in a vertical column and fluidizing with an upward flow of $N_2$. The column was heated slowly to 600° C. and held at that temperature for 12 hours after which the silica was cooled to ambient temperatures.

The melt index (MI) and melt index ratio (MIR) were measured in accordance with ASTM Test D1238.

EXAMPLE 1

Preparation of Catalytic Component

Silica gel (5.0 g Davison 952, dehydrated at 600° C.) was charged to a 125 ml vial and slurried in 20 ml of degassed and dried nonane. To the stirred slurry there was then charged 6 ml of a solution of butylethyl magnesium (BEM) obtained from Texas Alkyls, Inc. comprising 0.69 mmole BEM/ml solution. The BEM solution was added dropwise at 60° C. temperatures while stirring the slurry vigorously. The stirring was continued for 1 hour. A 3 ml portion of a solution of VO(O-BU)$_3$ in nonane containing 0.35 mmole VO(OBU)$_3$ per ml of solution was slowly added to the slurry with constant stirring. The temperature was gradually increased to 110° C. under vigorous stirring conditions. The stirring was continued for 1 hour. 3.7 ml of a solution of boron trichloride in hexane containing 1 mmole of boron per ml of solution was added to the slurry and stirring was continued for 1 hour at 60° C. The slurry was filtered, the solids recovered and washed with hexane and dried in vacuo.

Polymerization

To a 1.8 liter autoclave was charged 800 ml of purified hexane, and 6.2 mmoles of triisobutylaluminum in 7.0 ml of a heptane solution. Trichlorofluoromethane activator was injected into the reactor so as to provide a 200:1 activator/vanadium mole ratio. 2.5 ml of a slurry of the vanadium containing solid in mineral oil having a concentration of 0.05 g of vanadium solid per cc was added to the reactor via a syringe. The reactor temperature was raised to 85° C., pressured to 10 psig with $H_2$ and to a total pressure of 300 psig with ethylene. 35 ml of butene-1 were added with the ethylene. The pressure was maintained by constant flow of ethylene. The polymerization was maintained for 40 minutes. The resulting polymer had an MI of 0.77 and an MIR of 55.4. The specific activity (Kg PE/g-V-hr-m/1C$_2$=) was 85.1.

EXAMPLE 2

Preparation of Catalytic Component

Silica gel (5.0 g Davison 952, dehydrated at 600° C.) was charged to a 125 ml vial and slurried in 20 ml of degassed and dried nonane. To the stirred slurry there was then charged 6.0 ml of a heptane solution of butylethyl magnesium (BEM) obtained from Texas Alkyls, Inc. comprising 0.69 mmole BEM/ml solution. The BEM solution was added dropwise at 60° C. while stirring the slurry vigorously. The stirring was continued for 1 hour. A 3.0 ml portion of a solution of VO(O-BU)$_3$ in nonane containing 0.35 mmole VO(OBU)$_3$ per ml of solution was slowly added to the slurry with constant stirring. The temperature was gradually increased to 110° C. under vigorous stirring conditions. The stirring was continued for 1 hour. 3.7 ml of a solution of borontrichloride in hexane containing 1 mmole of boron per ml of solution was added to the slurry and stirring was continued for 1 hour at 60° C. The slurry was filtered, the solids recovered and washed with hexane and dried in vacuo.

Polymerization

To a 1.8 liter autoclave was charged 800 ml of purified hexane, and 1.8 mmoles of triisobutylaluminum in 2.0 ml of heptane solution. Trichlorofluoromethane activator was injected into the reactor so as to provide for a 200:1 activator/vanadium mole ratio. 5.0 ml of a mineral oil slurry of the vanadium-containing solid having a concentration of 0.05 g of vanadium compound per cc was added to the reactor via a syringe. The reactor temperature was raised to 85° C., pressure to 30 psig with $H_2$ and to a total pressure of 300 psig with ethylene comprising 45 ml of butene-1. The pressure was maintained by constant flow of ethylene. The polymerization was maintained for 40 minutes. The resulting polymer has an MI of 89.1 and an MIR of 30.7. The specific activity (Kgr PE/g-V-hr-m/1C$_2$=) was 284.4.

EXAMPLE 3

Preparation of Catalytic Component

Silica gel (5.0 g Davison 952, dehydrated at 600° C.) was charged to a 125 ml vial and slurried in 20 ml of degassed and dried nonane. To the stirred slurry there was then charged 6.0 ml of a heptane solution of butylethyl magnesium (BEM) obtained from Texas Alkyls, Inc. comprising 0.69 mmole BEM/ml solution. The BEM solution was added dropwise at 60° C. while stirring the slurry vigorously. The stirring was continued for 1 hour. A 3.0 ml portion of a solution of VO(O-BU)$_3$ in nonane containing 0.35 mmole VO(OBU)$_3$ per ml of solution was slowly added to the slurry with constant stirring. The temperature was gradually increased to 110° under vigorous stirring conditions. The stirring was continued for 1 hour. A 2.4 ml solution of ethyl aluminum dichloride in heptane containing 1.57 mmole of aluminum per ml of solution was added to the slurry and stirring was continued for 30 minutes at 60° C. The slurry was filtered, the solids washed with hexane and dried in vacuo.

Polymerization

To a 1.8 liter autoclave was charged 800 ml of purified hexane, and 1.8 mmoles of triisobutylaluminum in 2 ml of heptane solution. Trichlorofluoromethane activator was injected into the reactor so as to provide for a 200:1 activator/vanadium mole ratio. 5.0 ml of a mineral oil slurry of a catalyst having a concentration of 0.05 g of vanadium compound per cc was added to the reactor via a syringe. The reactor temperature was raised to 85° C., pressured to 10 psig with $H_2$ and to a total pressure of 300 psig with ethylene comprising 30 ml of butene-1. The pressure was maintained by a constant flow of ethylene. The polymerization was maintained for 40 minutes. The resulting polymer has an MI of 0.65 and an MIR of 64.5. The specific activity (Kgr PE/g-V-hr-m/1C$_2$=) was 115.4.

EXAMPLE 4

Preparation of Catalytic Component

The catalyst was prepared exactly as in Example 3.

Polymerization

To a 1.8 liter autoclave was charged 800 ml of purified hexane, and 1.8 mmoles of triisobutylaluminum in 2.0 ml of heptane solution. Trichlorofluoromethane activator was injected into the reactor so as to provide for a 200:1 activator/vanadium ratio. A 5.0 ml mineral oil slurry of the catalyst having a concentration of 0.05 g of vanadium compound per cc was added to the reactor via a syringe. The reactor temperature was raised to 85° C., pressured to 30 psig with $H_2$ and to a total pressure of 280 psig with ethylene comprising 45 ml of butene-1. The pressure was maintained by constant flow of ethylene. The polymerization was maintained for 40 minutes. The resulting polymer has an MI of 50.0 and an MIR of 41.1. The specific activity (Kgr PE/g-V-hr-m/1$C_2$=) was 130.4.

EXAMPLE 5

Preparation of Catalytic Component

Silica gel (5.0 g Davison 952, dehydrated at 600° C.) was charged to a 125 ml vial and slurried in 20 ml of degassed and dried nonane. To the stirred slurry there was then charged a 6 ml heptane solution of butylethyl magnesium (BEM) obtained from Texas Alkyls, Inc. comprising 0.69 mmole BEM/ml solution. The BEM solution was added dropwise at 60° C. while stirring the slurry vigorously. The stirring was continued for 1 hour. 4.0 mmoles of dried and degassed n-butanol was added to the suspension. The stirring was continued for 1 hour at 60° C. A 3.0 ml portion of a solution of VO(OBu)$_3$ in nonane containing 0.35 mmoles VO(O-Bu)$_3$ per mm of solution was slowly added to the slurry with constant stirring. The temperature was gradually increased to 110° C. while stirring continuously. The stirred reaction was maintained for 1 hour. A 3.7 ml solution of boron trichloride in hexane containing 1 mmole of boron per ml of solution was added to the slurry under constant stirring and the stirred solution was maintained for 1 hour at 60° C. The slurry was filtered, the solids recovered and washed with hexane and dried in vacuo.

Polymerization

To a 1.8 liter autoclave was charged 800 ml of purified hexane, and 1.8 mmoles of triisobutylaluminum in 2.0 ml of heptane solution. Trichlorofluoromethane activator was injected into the reactor so as to provide for a 200:1 activator/vanadium ratio. A 5.0 ml mineral oil slurry of the vanadium solid having a concentration of 0.05 g of vanadium solid per cc was added to the reactor via a syringe. The reactor temperature was raised to 85° C., pressured to 10 psig with $H_2$ and to a total pressure of 300 psig with ethylene comprising 30 ml of butene-1. The pressure was maintained by constant flow of ethylene. The polymerization was maintained for 40 minutes. The resulting polymer has an MI of 4.44 and an MIR of 37.0. The specific activity (Kgr PE/g-V-hr-m/1$C_2$=) was 357.6.

EXAMPLE 6

Preparation of Catalytic Component

Silica gel (5.0 g Davison 952, dehydrated at 600° C.) was charged to a 125 ml vial and slurried in 20 ml of degassed and dried nonane. To the stirred slurry there was then charged a 6 ml heptane solution of butylethyl magnesium (BEM) obtained from Texas Alkyls, Inc. comprising 0.69 mmole BEM/ml solution. The BEM solution was added dropwise at 60° C. while stirring the slurry vigorously. The stirring was continued for 1 hour. 4.0 mmoles of dried and degassed n-butanol was added to the suspension. The stirring was continued for 1 hour at 60° C. A 3.0 ml portion of a solution of VO(OBu)$_3$ in nonane containing 0.35 mmoles VO(O-Bu)$_3$ per mm of solution was slowly added to the slurry with constant stirring. The temperature was gradually increased to 110° C. while stirring continuously. The stirred reaction was maintained for 1 hour. A 3.7 ml solution of boron trichloride in hexane containing 1 mmole of boron per ml of solution was added to the slurry under constant stirring and the stirred solution was maintained for 1 hour at 60° C. The slurry was filtered, the solids recovered and washed with hexane and dried in vacuo.

Polymerization

To a 1.8 liter autoclave was charged 800 ml of purified hexane, and 1.8 mmoles of triisobutylaluminum in 2.0 ml of heptane solution. Trichlorofluoromethane activator was injected into the reactor so as to provide for a 200:1 activator/vanadium ratio. A 5.0 ml mineral oil slurry of the vanadium solid having a concentration of 0.05 g of vanadium solid per cc was added to the reactor via a syringe. The reactor temperature was raised to 85° C., pressured to 30 psig with $H_2$ and to a total pressure of 270 psig with ethylene comprising 45 ml of butene-1. The pressure was maintained by constant flow of ethylene. The polymerization was maintained for 40 minutes. The resulting polymer has an MI of 632.31. The specific activity (Kgr PE/g-V-hr-m/1$C_2$=) was 209.9.

EXAMPLE 7

Preparation of Catalytic Component

Silica gel (5.0 g Davison 952, dehydrated at 600° C.) was charged to a 125 ml vial and slurried in 20 ml of degassed and dried nonane. To the stirred slurry there was then charged a 6 ml heptane solution of butylethyl magnesium (BEM) obtained from Texas Alkyls, Inc. comprising 0.69 mmole BEM/ml solution. The BEM solution was added dropwise at ambient temperatures while stirring the slurry vigorously. The stirring was continued for 1 hour. 4.0 mmoles of dried and degassed n-butanol was added to the suspension. The stirring was continued for 1 hour at 60° C. A 3.0 ml portion of a solution of VO(OBu)$_3$ in nonane containing 0.35 mmoles V0(OBu)$_3$ per mm of solution was slowly added to the slurry with constant stirring. The temperature was gradually increased to 100° C. while stirring continuously. The stirred reaction was maintained for 1 hour. A 2.4 ml solution of ethyl aluminum dichloride in heptane containing 1.57 mmole of aluminum per ml of solution was added to the slurry under constant stirring and the stirred solution was maintained for 30 minutes at 60° C. The slurry was filtered, the solids, recovered and washed with hexane and dried in vacuo.

Polymerization

To a 1.8 liter autoclave was charged 800 ml of purified hexane, and 1.8 mmoles of triisobutylaluminum in 2.0 ml of heptane solution. Trichlorofluoromethane activator was injected into the reactor so as to provide for a 200:1 activator/vanadium ratio. A 5.0 ml mineral oil slurry of the vanadium solid having a concentration of 0.05 g of vanadium solid per cc was added to the reactor via a syringe. The reactor temperature was raised to 85° C., pressured to 10 psig with $H_2$ and to a total pressure of 300 psig with ethylene comprising 30 ml of butene-1. The pressure was maintained by constant flow of the ethylene-butene-1 mixture. The polymerization was maintained for 40 minutes. The resulting polymer has an MI of 0.8 and an MIR of 46.9. The specific activity (Kgr PE/g-V-hr-m/$1C_2$=) was 80.8.

EXAMPLE 8

Preparation of Catalytic Component

The catalyst of the previous example was used in this example under different polymerization conditions.

Polymerization

To a 1.8 liter autoclave was charged 800 ml of purified hexane, and 1.8 mmoles of triisobutylaluminum in 2.0 ml of heptane solution. Trichlorofluoromethane activator was injected into the reactor so as to provide for a 200:1 activator/vanadium ratio. A 5.0 ml mineral oil slurry of the vanadium solid having a concentration of 0.05 g of vanadium solid per cc was added to the reactor via a syringe. The reactor temperature was raised to 85° C., pressured to 30 psig with $H_2$ and to a total pressure of 270 psig with ethylene comprising 30 ml of butene-1. The pressure was maintained by constant flow of the ethylene-butene-1 mixture. The polymerization was maintained for 40 minutes. The resulting polymer had an MI of 94.5; the HLMI was too high to measure accurately. The specific activity (Kgr PE/g-V-hr-m/$1C_2$=) was 95.6.

EXAMPLE 9

Preparation of Catalytic Component

Silica gel (5.0 g Davison 952, dehydrated at 500° C.) was charged to a 125 ml vial and slurried in 20 ml of degassed and dried hexane. To the stirred slurry there was then charged a 6 ml heptane solution of butylethyl magnesium (BEM) obtained from Texas Alkyls, Inc. comprising 0.69 mmole BEM/ml solution. The BEM solution was added dropwise at 32° C. while stirring the slurry vigorously. The stirring was continued for 1 hour. 4.4 mmoles of dried and degassed n-butanol was added to the suspension. The stirring was continued for 1 hour at 32° C. A 3.0 ml portion of a solution of VO(n-OC$_3$H$_7$)$_3$ in hexane containing 0.39 mmoles VO(n-OC$_3$H$_7$)$_3$ per mm of solution was slowly added to the slurry with constant stirring. The temperature was maintained at 32° C. while stirring was maintained continuously. The stirred reaction was maintained for 2 hours. A 3.7 ml solution of boron trichloride in hexane containing 1 mmole of boron per ml of solution was added to the slurry under constant stirring and the stirred solution was maintained for 1 hour at 32° C. The slurry was filtered, the solids recovered and washed with hexane and dried in vacuo.

Polymerization

To a 2.14 liter autoclave was charged 800 ml of purified hexane, and 1.8 mmoles of triisobutylaluminum in 2.0 ml of heptane solution. Trichlorofluoromethane activator was injected into the reactor so as to proivde for a 200:1 activator/vanadium ratio. A 2.5 ml mineral oil slurry of the vanadium solid having a concentration of 0.05 g of vanadium solid per cc was added to the reactor via a syringe. The reactor temperature was raised to 85° C., 11 mmoles of $H_2$ were added, and the reactor was pressurized to a total pressure of 150 psig with ethylene comprising 40 ml of butene-1. The pressure was maintained by constant flow of ethylene. The polymerization was maintained for 40 minutes. The resulting polymer had an MI of 0.27 and an MIR of 56. The specific activity (Kgr PE/g-V-hr-m/$1C_2$=) was 231.

EXAMPLE 10

Catalyst Preparation 4.1 mmoles of ethyl-n-butylmagnesium in 6.0 ml of a heptane solution were diluted in 5.0 ml of hexane in a 125 ml vial, and 0.4 ml of n-butanol were added with stirring. The mixture was stirred at room temperature until all of the precipitate had dissolved. Silica gel (5.0 g, Davison 952, dried at 500° C.) was charged to a 125 ml vial, slurried in 20 ml hexane, and heated in an oil bath to 32° C. To the stirred suspension of the premixed ethyl-n-butylmagnesium/butanol solution was added. The reaction slurry was stirred for 1 hour at 32° C. To the reaction slurry was added 1.1 mmoles of vanadium tri-n-propoxide oxide in 3.0 ml of a hexane solution and stirring was continued for 1 hour at 32° C. To the vial was then added 3.7 mmoles of boron trichloride in 3.7 ml of hexane solution, and the reaction mixture was stirred for 1 hour at 32° C. Stirring was discontinued, and after the slurry had settled the supernatant was decanted, and the catalyst was dried under a stream of dry nitrogen.

Polymerization

To a 2.1 liter stirred autoclave reactor was charged 850 ml of purified dry hexane. The hexane was heated to 50° C. To this was added 1.8 mmoles triisobutyl aluminum in 2 ml of hexane solution. A white oil slurry containing 0.125 grams of the vanadium containing catalyst (0.05 g/cc) was injected into the reactor via a syringe. 11 mmoles of Freon-11 activator were then injected into the reactor. The reactor was heated to 85° C., 20 mmoles $H_2$ were added followed by 0.420 mmoles of butene, and it was then pressured to a total of 150 psig with ethylene. The polymerization was maintained for 40 minutes after which time the reactor was vented to atmospheric pressure, and the polymer recovered and dried. The polymer had a MI of 0.47 dg/min and a MIR of 70.7. The catalyst had a specific activity of 222 kg/PE/gV.mole.$1^{-1}$.atm, and a productivity of 576 grams PE/g catalyst.

EXAMPLE 11

Catalyst Preparation

The catalyst was prepared exactly as in the previous example, except that silica gel dehydrated at 800° C. was used in the place of silica gel dehydrated at 500° C.

Polymerization

To a 2.1 liter stirred autoclave reactor was charged 850 ml of purified dry hexane. The hexane was heated to 50° C. To this was added 1.8 mmoles triisobutyl aluminum in 2 ml of hexane solution. A white oil slurry containing 0.125 grams of the vanadium containing catalyst (0.05 g/cc) was injected into the reactor via a syringe. 11 mmoles of Freon-11 activator were then injected into the reactor. The reactor was heated to 85° C., 20 mmoles H$_2$ were added followed by 0.420 mmoles of butene, and it was then pressured to a total of 150 psig with ethylene. The polymerization was maintained for 40 minutes after which time the reactor was vented to atmospheric pressure, and the polymer recovered and dried. The polymer has a MI of 4.30 dg/min and a MIR of 40.5. The catalyst had a specific activity of 405 kg/PE/gV.mole.l$^{-1}$.atm, and a productivity of 1120 grams PE/g catalyst.

What is claimed is:

1. A process for the polymerization of ethylene and alpha-olefins having from 1 to 20 carbon atoms of mixtures of ethylene, alpha-olefins or diolefins which process comprise polymerizing one or more olefins in the presence of the catalyst system comprising (A) an organo aluminum cocatalyst, and (B) a vanadium-containing catalyst component obtained by sequentially treating an inert solid support material in an inert solvent with (i) a dihydrocarbyl magnesium compound, (ii) optionally an oxygen-containing compound which is an alcohol, ketone or aldehyde, (iii) a vanadium compound, and (iv) a Group IIIa metal halide.

2. The process as in claim 1 wherein the dihydrocarbyl magnesium compound is represented by the formula R$^1$MgR$^2$ or a complex thereof with an aluminum compound, wherein each of R$^1$ and R$^2$, which may be the same or different, are an alkyl group, aryl group, cycloalkyl group, aralkyl group having from 1 to 20 carbon atoms, the vanadium compound is represented by the general formulas:

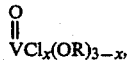 (1)

where x=0-3 and R=a hydrocarbon radical;

VCl$_y$(OR)$_{4-y}$, (2)

where y=3-4 and R=a hydrocarbon radical;

 (3)

where z=2-3 and (AcAc)=acetyl acetonate group;

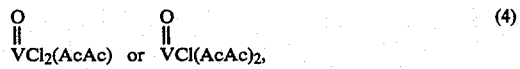 (4)

where (AcAc)=acetyl acetonate group; or

 (5)

where n=2-3 and L=a Lewis base which forms hydrocarbon-soluble complexes with VCl$_3$; and the Group III metal halides are selected from boron trichloride, boron hydrocarbyl halides and aluminum alkyl halides.

3. The process as in claim 2 wherein the Group III metal halide is selected from boron trichloride, ethyl aluminum dichloride and ethyl boron dichloride.

4. The process as in claim 1 wherein the inert solid support material is an inorganic oxide or mixtures of inorganic oxides.

5. The process as in claim 4 wherein the inorganic oxide is silica.

6. The process as in claim 2 wherein the vanadium compound is selected from vanadyl trichloride, vanadium tetrachloride, vanadyl tributoxy and vanadyl chloride dibutoxy.

7. The process as in claim 1 wherein the dihydrocarbyl magnesium compound is selected from dialkyl magnesium compounds wherein the alkyl groups, which may be the same or different, have 1 to 10 carbon atoms.

8. The process as in claim 2 wherein the oxygen-containing compound is selected from alcohols represented by the formula R$^3$OH wherein R$^3$ is an alkyl group, aryl group, cycloalkyl group, aralkyl group, alkadienyl group or alkenyl group having 2 to 20 carbon atoms.

9. The process as in claim 2 wherein the dihydrocarbyl magnesium and the oxygen-containing compound are reacted together prior to contact with the inert solid support material.

10. The process as in claim 2 wherein the dihydrocarbyl magnesium compound is contacted with the inert solid support material prior to the addition of the oxygen-containing compound.

11. The process as in claim 2 wherein the Group III metal halide is selected from boron trichloride and ethyl aluminum dichloride.

12. The process as in claim 11 wherein the Group III metal halide is ethyl aluminum dichloride.

* * * * *